UNITED STATES PATENT OFFICE.

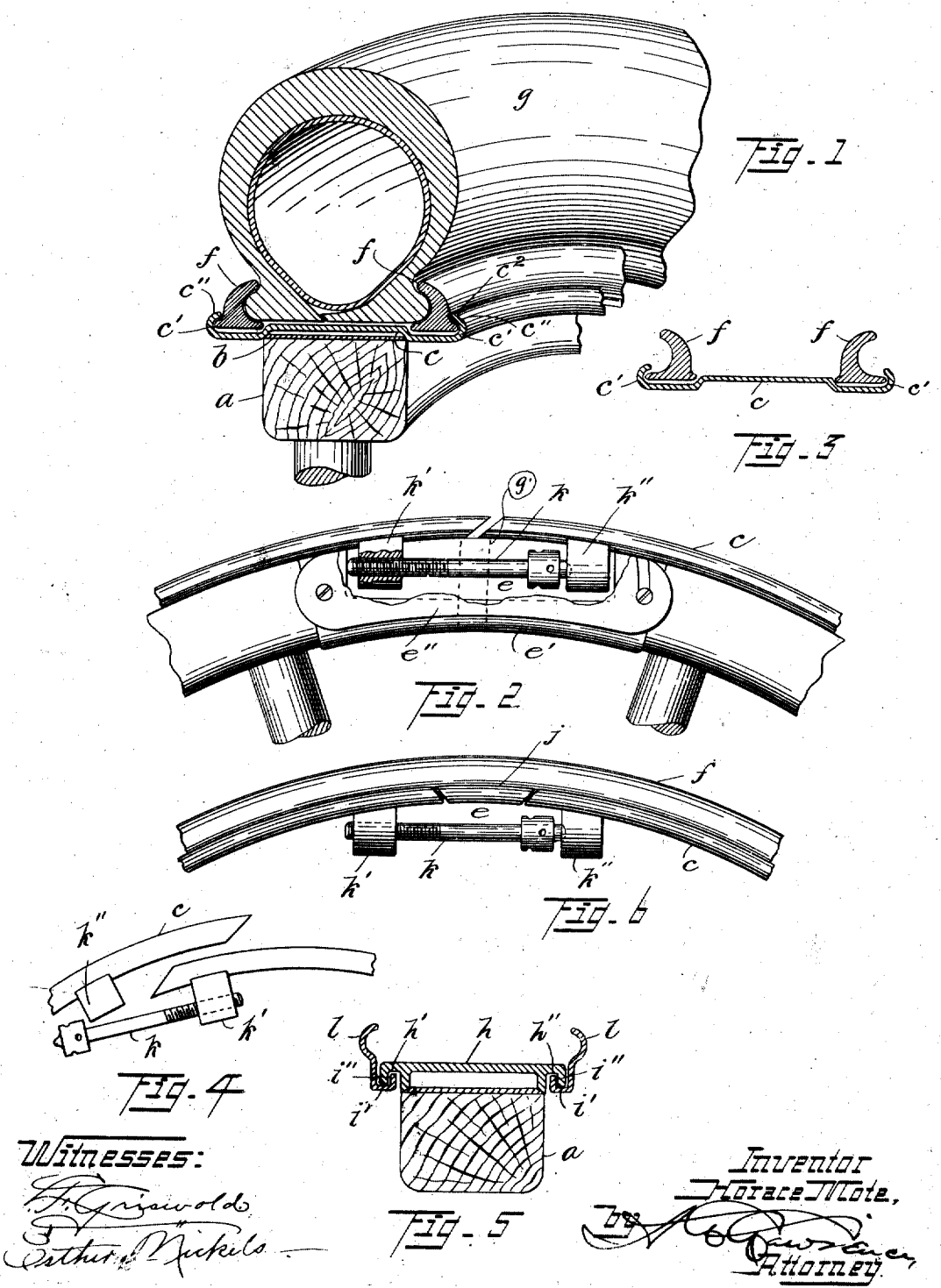

HORACE MOTE, OF CLEVELAND, OHIO.

DEMOUNTABLE AND SEPARABLE VEHICLE-WHEEL RIM.

1,229,639.     Specification of Letters Patent.     Patented June 12, 1917.

Application filed March 30, 1912. Serial No. 687,361.

*To all whom it may concern:*

Be it known that I, HORACE MOTE, a subject of the King of England, residing at Cleveland, in the county of Cuyahoga and State of Ohio, have invented certain new and useful Improvements in Demountable and Separable Vehicle-Wheel Rims, of which the following is a specification, reference being had to the accompanying drawings, forming a part thereof.

My invention relates to improvements in demountable and separable vehicle wheel rims, and has for its object the provision of a simple, strong and efficient rim, which shall also be easily manufactured and readily handled by the user.

In my improved construction, I have availed of the force exerted by the inflated tire, for aiding in retaining the rim upon the vehicle wheel. Furthermore, I have provided a rim comprising simply a rolled, annular base-portion, transversely split and suitably shaped, to receive two rings or flange-members, adapted to accommodate tires either of the clencher or non-clencher types.

Preferably the base portion is provided with a suitable device for expanding and contracting the same, while an interior channel is afforded for accommodating the felly-band of the wheel.

Further details of construction may best be explained by referring to the accompanying drawings, wherein:—

Figure 1. is a combined sectional and fragmentary isometric projection of a felly-rim and tire embodying my improvements;

Fig. 2. is a fragmentary side view, partially broken away, showing the rim, screw-mechanism and felly;

Fig. 3. is a sectional view of the rim, illustrating a minor modification;

Fig. 4. is a fragmentary view of the overlapped ends of the base-portion;

Fig. 5. is a transverse sectional view of an additional modified type of rim mounted upon its felly, and Fig. 6. is a fragmentary side view illustrating an additional modification.

Throughout the several figures of the drawings, I have employed the same character of reference to indicate similar parts.

From an inspection of the drawings, it will be apparent that my improved rim, is of the simplest construction, comprising as it does, but three principal members. Two of these are merely reversible retaining-rings, which are adapted to hold the tire in position, when the rim is mounted upon the wheel. The third member, or base-portion of the rim, is of peculiar construction and affords a central interior retaining channel which is clamped closely about the felly-band of the wheel, while two lateral channels, either exteriorly or interiorly disposed, and whose walls are coincident with the former, are adapted to accommodate and permit the insertion and removal of said rings, when the rim is demounted from the wheel.

Referring to Fig. 1, it is seen that the felly $a$ of the wheel is provided with a metal felly-band $b$, which fits in the base portion $c$ of the rim. This member $c$ is rolled from sheet metal, to provide a split annulus, as best shown in Fig. 2; the ends thereof being slightly beveled and united by means of lugs $k'$ $k''$ and a screw device $e$. By means of said screw the rim-member $c$ may be caused to expand or contract, for the purpose of slipping it, together with the attached tire, upon and off from the felly of the wheel; inasmuch as said rim-member when expanded, is of slightly larger circumference than the felly-band.

Two continuous annular retaining-rings $f$ are assembled upon said rim-member, as below described, for retaining the tire $g$ in place upon the wheel. In order to accommodate the flanged rings, and the felly-band, respectively, the base portion $c$ is peculiarly rolled to afford two exterior channels $c'$ which normally are of less circumference than the retaining rings $f$, while continuous over-turned lateral flanges $c''$ are provided for the normal retention of said rings within their respective channels formed in said base portion $c$.

As indicated in Figs. 1 and 3, these retaining rings $f$ may be reversed in position, to secure either the clencher or non-clencher type of tire, such as the Dunlop tire, removably upon the wheel, and since each ring is integral or continuous, it is impossible to displace the rings from their respective seats in the base portion, as long as the rim is positioned upon the felly of the wheel.

The overturned flanges $c''$ are so proportioned as to engage the bases of the rings $f$ and form what I may term a "clencher flange" for securely holding said rings and tire firmly upon the base-portion and supporting wheel. In the modified construction, of Fig. 3 these annular flanges are shown to be of equal height, while the rings are reversed in position to receive a Dunlop style of tire.

In Fig. 1. however, the right hand flange $c''$ has a slight upwardly extending flange $c^2$ to form an additional abutment for the inwardly positioned ring as mounted upon the wheel.

In Fig. 5. I have shown a modified type of rim exhibiting the same principles of construction and operation. These structural differences, however comprise a base-portion $h$, transversely split and equipped with screw-mechanism, as before explained, which however, has the respective channels $h'$ $h''$, both interiorly positioned within the rim, but otherwise said member is constructed in the manner above described. The continuous retaining rings $l$ are correspondingly modified to afford interiorly engaging grooves $i'$ and flanges $i''$, for fitting within said channeled base portion.

Fig. 6 presents a slight modification, which is found in the inserted section $j$, bridging the separated ends of the base portion $c$ of the rim. The removal of said member $j$, after the rim has been de-mounted from the wheel, permits the ends to be brought together, in order to remove the outer ring $f$ and tire $g$.

The operation of my improved demountable rim may now be explained. The annular base-portion is first contracted in circumference, by over-lapping the severed, but normally connected ends, as indicated in Fig. 4. One of the retaining rings $f$ is then slipped into its channel, the tire $g$ is placed upon the rim and the second or outer retaining ring $f$ is placed in position within its channel. The felly is longitudinally slotted to accommodate the screw-mechanism; said slot being reinforced at $e'$ and provided with a pivoted cover plate $e''$, which is shown partially broken away in Fig. 2.

The base-portion is explained by turning screw $k$ to separate the split end portions as it reacts against the lugs $k'$ $k''$. The valve-stem $g'$ (indicated by dotted lines, Fig. 2,) and the screw device $e$, may now be inserted within the spaces provided therefor in the slotted and bored felly; the same being either laterally or longitudinally displaced. Then the rim and tire are mounted upon the wheel, so that the channel $c'$ registers with the felly band. The screw is then turned in the opposite direction to decrease the circumference of the base portion of the rim, to the extent desired. Thus, said screw $k$ reacts upon the left hand wall of the slotted felly, drawing the tapped lug $k'$ and its attached end of the base-portion $c$, toward the right, while lug $k''$, being forced against the right hand wall of the slot, anchors the other end of said base-portion and the ends, accordingly, are drawn together. Moreover, the rim is held against circumferential displacement, by these means.

In view of the construction of parts above set forth, the inflated tire acts circumferentially against the transversely split base-portion and materially assists in seating it upon the felly-band of the wheel. Accordingly, my improved demountable and separable rim is seen to comprise two rings of such circumference as to accommodate and hold securely in position, the annular retaining members of a tire. These are employed in conjunction with a base-portion of variable circumference, which may be contracted to receive the rings and tire, then expanded to fit over the wheel felly and finally contracted by means of the screw and air pressure of the tire, sufficiently to hold the wheel, rim and tire in fixed relation. The wheel, of course, affords a rigid abutment at all points for preventing buckling or undue contraction of the base-portion of said rim.

Having now described the preferred embodiments of my invention, I claim as new, and desire to secure by Letters Patent, the following:—

1. In a device of the class described, the combination with a wheel and its felly, of a demountable tire and rim therefor; the latter comprising two endless retaining rings and a split annular base-portion having an interior channel adapted to be contracted to fit over said felly and two laterally-positioned channels adapted to accommodate the retaining rings, substantially as set forth.

2. In a device of the class described, the combination with a wheel and its felly, of a demountable tire and rim therefor; the latter comprising two endless retaining rings and a transversely split rolled annular base-portion having an interior channel adapted to be contracted to fit over said felly and two exterior, laterally-positioned channels adapted to accommodate the retaining rings, substantially as set forth.

3. In a device of the class described, the combination with a wheel and its felly, of a demountable tire and rim therefor; the latter comprising two endless retaining rings and a transversely split rolled annular base portion having an interior channel adapted to be contracted to fit over said felly and two exterior, laterally-positioned channels adapted to accommodate the retaining rings, and suitable means for expanding and contracting said annular base-portion, substantially as set forth.

4. In a device of the class described, the combination with a wheel and its felly, of a demountable tire and rim therefor; the latter comprising two endless retaining rings and a split annular base-portion having an interior channel adapted to be contracted to fit over said felly and two laterally-positioned peripheral channels adapted to accommodate the retaining rings; the sides of the inner channel respectively forming inner side walls for the peripheral channels, and screw-mechanism rotatably connected near the ends of said base-portion, substantially as set forth.

5. In a demountable and separable rim for vehicle wheels, a laterally split base-portion shaped to provide an interior channel adapted to accommodate the felly, and two over-turned lateral annular flanges, of two endless retaining rings adapted to fit respectively within the over-turned flanges, and a screw-device for expanding and contracting said base portion, substantially as set forth.

6. In a demountable and separable rim for vehicle wheels, a laterally split base-portion shaped to provide an interior channel adapted to accommodate the felly, and two over-turned lateral annular flanges, integral therewith, of two endless retaining rings adapted to fit respectively within the over-turned flanges, a screw-device for expanding and contracting said base-portion, and a removable sectional base-portion positioned between the split ends of the annular base-portion, substantially as set forth.

7. In a vehicle wheel rim of the class described, the combination with a pneumatic tire, of a rim-member adapted to receive and mount the inflated tire, comprising an integral base-portion shaped to afford an interior annular channel and two lateral annular retaining flanges, screw-mechanism adapted to expand said base-portion against the pressure of the inflated tire, and two endless retaining rings secured in place by the annular flanges, and adapted to retain the base of the tire within the rim, substantially as set forth.

8. In a vehicle wheel, the combination with the wheel-member and its felly, of a detachable rim-member adapted to receive and mount an inflated tire, comprising a split annular base-portion shaped to afford an interior annular channel adapted to fit upon the felly, and two peripheral annular channels provided with lateral flanges, two retaining rings respectively fitting within, and slightly larger in diameter than said peripheral channels, respectively secured in place by the flanges, and screw-mechanism adapted to expand and contract the base portion, for the purpose of adjusting and seating the rim upon the felly, substantially as set forth.

In testimony whereof I do now affix my signature in the presence of two witnesses.

HORACE MOTE.

Witnesses:
   ESTHER M. NICKELS,
   ALBERT LYNN LAWRENCE.